Aug. 7, 1934.   L. GOLDHAMMER   1,968,938
MOTION PICTURE APPARATUS
Filed March 16, 1932
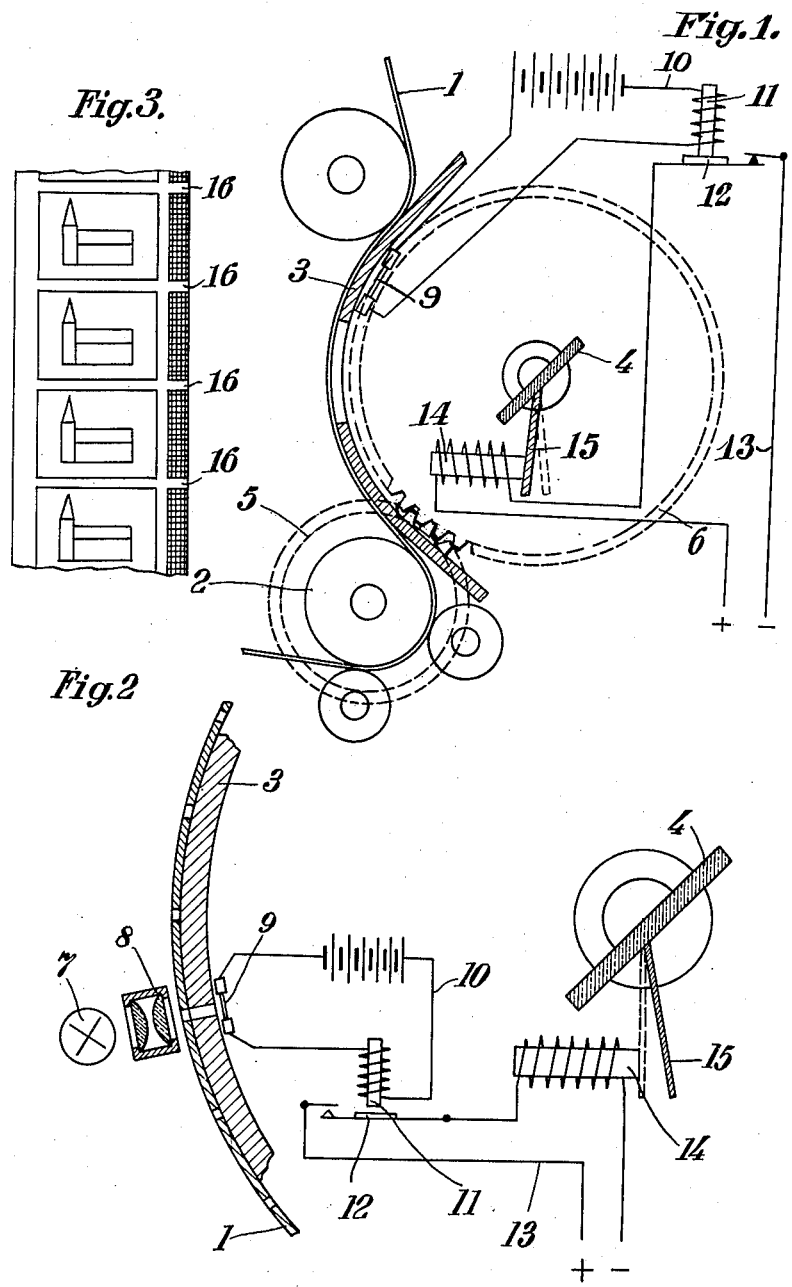

Patented Aug. 7, 1934

1,968,938

UNITED STATES PATENT OFFICE 1,968,938

MOTION PICTURE APPARATUS

Leo Goldhammer, Munich, Germany, assignor to Agfa Ansco Corporation, Binghamton, N. Y., a corporation of New York Application March 16, 1932, Serial No. 599,314
In Germany March 16, 1931

4 Claims. (Cl. 88—16.8)

My present invention relates to an apparatus for either taking or projecting motion pictures and more particularly to such an apparatus employing a continuously moved film band and an oscillating mirror compensating the movements of the film.

One of its objects is a process according to which the back movement will always correspond with each picture regardless whether a change in the length of the film due, for instance, to shrinking, might occur. Another object is a device for carrying out this process. Further objects will be seen from the detailed specification following hereafter. Reference being made to the accompanying drawing in which Fig. 1 shows diagrammatically the known arrangement for advancing the mirror while moving the picture band continuously, Fig. 2 represents diagrammatically the mode of returning the mirror, the return movement being controlled by the perforations of the picture band, and Fig. 3 shows a film suitable for my invention having a blackened margin interrupted at distances equal to the length of one picture by a transparent area.

Both arrangements, of course, form a part of the same device.

In kinematograph apparatus with a continuously moved film, it is known to arrange an oscillating mirror, rotated at half the angular velocity of the film as it passes the gate, between the source of light and the film. After the beam of light reflected by the mirror has moved with the film a distance corresponding to the length of the picture, the mirror is moved backwards in order to illuminate the next picture on the film. The return of the mirror is effected by cam control or by another mechanical element. If the film shrinks, the length of the film advanced per unit of time does not correspond with the movement of the mirror, so that the projection is imperfect. It has been previously attempted to obviate this drawback by the insertion of a variable lever arm as the transmitting member between the cam element controlling the mirror and the rotary axle of the latter.

According to the invention, the film is blackened in the margin or zone of perforations, so that the rays of a source of light falling on this zone can only pass through the perforated holes or through portions of the marginal strip which are left unblackened. These parts of the film are employed for controlling a photo-electric cell by which the mirror is moved backwards in a manner described later. This backward movement of the mirror is effected by parts of the film, marked in any suitable manner, as by perforated holes or undarkened marginal places, passing a definite position, while the forward movement of the mirror is dependent on the feed rollers. In this manner the shrinking of the film has no effect, since the controlling part of the film effects the backward movement of the mirror earlier or later, in dependence on the greater or less shrinkage of the film.

The invention is shown diagrammatically in the accompanying drawing and will now be described in detail with reference thereto.

The film 1 is drawn by a, preferably plain, feed roller 2 over the curved gate 3. The mirror 4 is moved by a corresponding transmission gear, comprising for example the toothed gears 5, 6, at half the angular velocity of the film passing the gate. The gear wheel 6 is frictionally connected with the axle of the mirror, so that the mirror may be moved relatively to the gear wheel 6 in the opposite direction to the rotation of the wheel. As previously explained, the film 1, shown in section in Fig. 2, is blackened in the perforation zone, so that the beam from a source of light 7 can only pass through the holes. A condenser 8 is, preferably, arranged in the path of the beam to concentrate as far as possible the pencil of light on the holes in the film. The rays of light then fall on a photo-electric cell 9 controlling a relay 11, 12. The relay comprises an electromagnet 11 in the circuit 10. The electromagnet is energized by the passage of the rays through the holes in the film and attracts a contact plate 12 which closes a circuit 13. An electromagnet 14 is arranged in the circuit 13 which is energized, for example, from the lighting mains. The magnet 14, when energized, attracts a lever 15 connected with the axle of the mirror 4 and effects the backward movement of the mirror. When the magnet 14 is not traversed by current, the mirror 4 and the lever 15 connected with it are rotated by friction with the gear wheel 6. The contact plate 12, or the switch connected with the contact plate, is under the action of a spring, so that when the magnet 11 is not traversed by current the circuit 13 is interrupted and the electromagnet 14 is de-energized. At this time the mirror again commences its forward movement, since, due to its positive connection with the gear wheel 6, it rotates with the latter until it is moved backwards by the magnet 14. If the film is not perforated, the marginal zone is blackened, as explained previously, leaving unblackened spaces 16 as seen in Fig. 3 at a distance apart corresponding to that of the pictures. These transparent places serve for controlling the photo-electric cells. In a normal film in which several, for example four, perforations are provided in the length of a picture, all but one of the perforations contained in the length of a picture are masked. The unmasked perforation provided for every picture serves to control the photo-electric cell.

What I claim is:

1. In an apparatus for compensating by an oscillating mirror the movement of the film in projecting motion pictures, in combination a film gate, a film, a photo-electric cell, an illuminating device, means on said film co-operating with said illuminating device so as to intermittently actuate said photo-electric cell, means for advancing said film past said gate, an oscillating mirror frictionally connected to said film advancing means for being moved in the direction of the film movement, an electric relay controlled by said photo-electric cell and means controlled by said relay for moving said mirror in the direction opposite to the film-movement against the frictional engagement with said film advancing means.

2. In an apparatus for compensating by an oscillating mirror the movement of the film in projecting motion pictures, in combination a film gate, a film having transparent and opaque areas alternately arranged in a zone on the margin of said film, a photo-electric cell, means for controlling said photo-electric cell through the opaque zone of said film, an electric relay, an oscillating mirror, means for advancing said film past said gate and simultaneously moving said mirror in the direction of the film movement, said means for advancing said film being frictionally connected to said mirror, and means controlled by said electric relay for moving the mirror in the direction opposite to the film movement against the frictional engagement with said film advancing means in co-operation with the excitation of said photo-electric cell.

3. In an apparatus for compensating by an oscillating mirror the movement of the film in projecting motion pictures, in combination a curved film gate, a film having transparent and opaque areas alternately arranged in a zone on the margin of said film at the distance equal to the length of one picture area, a photo-electric cell, means for controlling said photo-electric cell through said zone of said film, an electric relay, an oscillating mirror, means for advancing said film past said gate and simultaneously moving said mirror in the direction of the film movement, said means for advancing said film being frictionally connected to said mirror, and means controlled by said electric relay for moving the mirror in the direction opposite to the film movement against the frictional engagement with said film advancing means in co-operation with the excitation of said photo-electric cell.

4. In an apparatus for compensating by an oscillating mirror the movement of the film in projecting motion pictures, in combination a curved film gate, a film having transparent and opaque areas alternately arranged in a zone on the margin of said film at the distance equal to the length of one picture area, a photo-electric cell, a source of light projecting a pencil of light by means of a condenser in the direction of said photo-electric cell on said zone, an electromagnet controlled by said photo-electric cell, a switch controlled by said electro-magnet, an oscillating mirror provided with a lever, means for advancing said film past said gate and simultaneously moving said mirror in the direction of the film movement at half the angular speed of said film, said means for advancing said film being frictionally connected to said mirror, a second electro-magnet arranged in a circuit with said switch for moving the mirror in the direction opposite to the film movement against the frictional engagement with said film advancing means by attracting said lever on excitation of said photo-electric cell by said source of light.

LEO GOLDHAMMER.